United States Patent [19]

Buck

[11] Patent Number: 4,896,100

[45] Date of Patent: Jan. 23, 1990

[54] SIGNAL CONDITIONER FOR CAPACITIVE TRANSDUCER

[75] Inventor: Iwar H. Buck, Franklin, Mass.

[73] Assignee: Hitec Products, Inc., Ayer, Mass.

[21] Appl. No.: 238,541

[22] Filed: Aug. 30, 1988

[51] Int. Cl.⁴ .................... G01R 27/26; G01R 11/52
[52] U.S. Cl. .................... 324/678; 324/683;
73/780; 73/724; 340/870.37
[58] Field of Search .............. 324/60 R, 60 C, 60 CD,
324/61 R; 340/870.37; 73/780, 724

[56] References Cited

U.S. PATENT DOCUMENTS

| | | |
|---|---|---|
| 3,852,672 | 12/1974 | Nelson . |
| 4,030,347 | 6/1977 | Norris et al. . |
| 4,054,049 | 10/1977 | Egger . |
| 4,080,562 | 3/1978 | Rubel .................... 324/60 C |
| 4,098,000 | 7/1978 | Egger . |
| 4,196,632 | 4/1980 | Sikorra . |
| 4,197,753 | 4/1980 | Harting et al. . |
| 4,322,977 | 4/1982 | Sell .................... 324/60 C |
| 4,445,386 | 5/1984 | Nielsen . |
| 4,634,964 | 1/1987 | Chattler .................... 324/60 C |
| 4,743,836 | 5/1988 | Grzybowski .................... 324/60 CD |
| 4,772,844 | 9/1988 | Andeen .................... 324/60 C |

OTHER PUBLICATIONS

J. M. Nielsen, "A Hermetically Sealed High Temperature Capacitive Strain Gage Design", date unknown.

Primary Examiner—Reinhard J. Eisenzopf
Assistant Examiner—Jose Solis
Attorney, Agent, or Firm—Wolf, Greenfield & Sacks

[57] ABSTRACT

A signal conditioner for generation of excitation signals and for detecting an output signal from a capacitive transducer such as a strain gage, a pressure transducer or an accelerometer. The signal conditioner includes a digital waveform generator for generating a waveform that approximates a sine wave and for generating a binary signal synchronized to the waveform, a filter responsive to the waveform for providing a first sinusoidal excitation signal, an analog inverter responsive to the first excitation signal for providing a second sinusoidal excitation signal that is 180° out of phase with the first excitation signal and a demodulator responsive to the binary signal for synchronously detecting an output signal from the capacitive transducer.

14 Claims, 2 Drawing Sheets

SIGNAL CONDITIONER FOR CAPACITIVE TRANSDUCER

FIELD OF THE INVENTION

This invention relates to apparatus for measurement of strain, pressure or acceleration in a test specimen and, more particularly, to a signal conditioner for use with a capacitive transducer. The signal conditioner includes a circuit for generating transducer excitation signals and a circuit for detecting an output signal from the transducer.

BACKGROUND OF THE INVENTION

Capacitive transducers include strain gages, pressure transducers and accelerometers. Typically, such transducers are utilized in a half-bridge configuration wherein the parameter being measured causes the capacitance of one or both capacitors of a capacitor pair to vary.

Capacitive strain gages are known in the prior art for measuring strain in a test specimen when the specimen is subjected to a mechanical force. Typically, capacitive strain gages have utilized capacitors with plates which are movable relative to each other as a function of applied strain. As a force is applied to the test specimen, relative movement of the capacitor plates causes the capacitance to change. The change in capacitance is sensed by detecting the change in an applied a.c. signal.

In a conventional prior art configuration, a capacitive strain gage utilizes two capacitors in a half-bridge configuration. Sine wave voltages of equal amplitude and opposite phase are applied to the two capacitors. In a quiescent condition, the two capacitors are equal, and the output of the strain gage is zero, since the out-of-phase excitation signals cancel. When a strain is applied to the test specimen, one of the capacitors changes value and the half-bridge is unbalanced, resulting in an output signal representative of the applied strain. A signal conditioner is used to generate the excitation signals and to amplify and demodulate the output signal from the strain gage.

In order for a capacitive strain gage or other capacitive transducer to provide an accurate measurement, the sinusoidal excitation waveform must be stable, both in amplitude and frequency. Conventional oscillators do not have the required amplitude and frequency stability. The signal conditioner must also provide linear demodulation of the output signal from the transducer. A signal conditioner for a capacitive strain gage utilizing a four quadrant multiplier notch filter demodulator is disclosed in U.S. Pat. No. 3,852,672 issued Dec. 3, 1974 to Nelson.

It is a general object of the present invention to provide an improved signal conditioner for a capacitive transducer.

It is another object of the present invention to provide a highly accurate signal conditioner for use with a capacitive transducer.

It is a further object of the present invention to provide a circuit for generating a sinusoidal voltage, that is stable in both amplitude and frequency.

It is yet another object of the present invention to provide a signal conditioner that is low in cost and easy to manufacture.

It is a further object of the present invention to provide a highly linear signal conditioner for use with a capacitive transducer.

SUMMARY OF THE INVENTION

According to the present invention, these and other objects and advantages are achieved in signal conditioning apparatus for operation of a capacitive transducer. The signal conditioning apparatus comprises a digital waveform generator for generating a waveform that approximates a sine wave and for generating a binary signal synchronized to the waveform, filter means responsive to the waveform for providing a first sinusoidal excitation signal, inverting means responsive to the first excitation signal for providing a second sinusoidal excitation signal that is 180° out of phase with the first excitation signal, means for applying the first and second excitation signals to the transducer so as to produce an output signal from the transducer, and demodulating means responsive to the binary signal for synchronously detecting the output signal from the transducer.

According to one aspect of the invention, the digital waveform generator includes a clock for generating a clock signal, a multiple stage shift register responsive to the clock signal, a resistive network comprising multiple resistors, each having a first terminal connected to one of the output stages of the shift register and having a second terminal connected to a summing point, and means for alternately loading a logic one and a logic zero into the shift register after each half cycle of the waveform, whereby the waveform that approximates the sine wave is produced at the summing point. Preferably, the clock comprises a quartz crystal oscillator and the shift register comprises a CMOS shift register. The shift register is preferably biased to produce at each stage binary output levels of equal voltage and opposite polarity. The values of the resistor network are selected to produce an approximately sinusoidal waveform at the summing point as the shift register is cycled.

According to another aspect of the present invention, the demodulating means comprises an analog single-pole, double-throw switch including first and second analog inputs and a control input responsive to the binary signal, means for applying the output signal of the capacitive transducer to the first analog input of the analog switch and inverting means responsive to the output signal of the capacitive transducer for providing an inverted output signal to the second analog input of the analog switch. Preferably, the analog switch comprises a CMOS analog switch.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
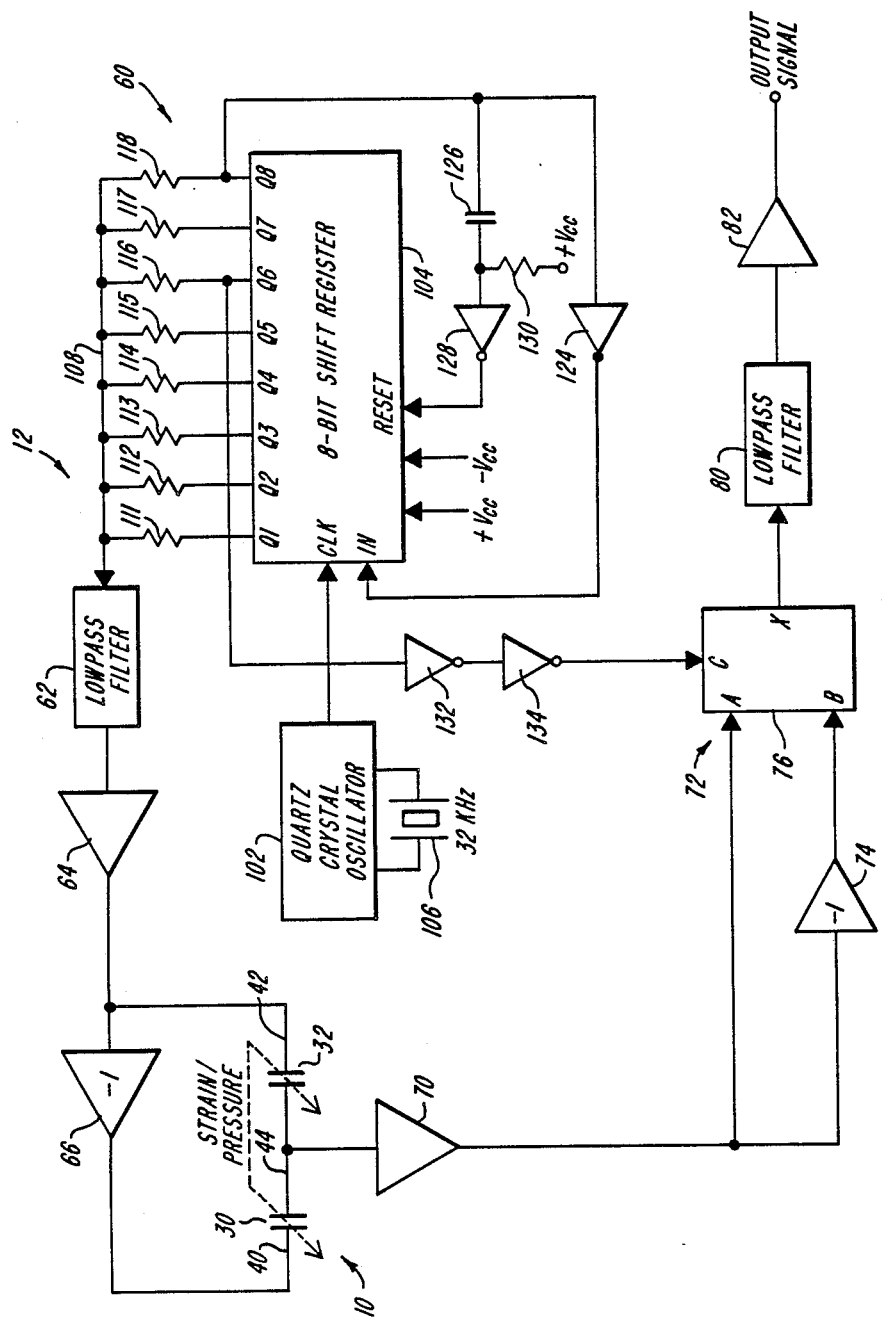
FIG. 1 is a block diagram showing a signal conditioner in accordance with the present invention coupled to a capacitive transducer.

A block diagram of a capacitive transducer measurement system is shown in FIG. 1. The system includes a capacitive transducer 10 and a signal conditioner 12.

The signal conditioner 12 generates excitation signals for the capacitive transducer 10 and senses and demodulates an output signal from the transducer 10 to provide a measurement. The transducer 10 can be a strain gage, a pressure transducer, an accelerometer or any other capacitive transducer utilizing a half-bridge configuration, as shown in FIG. 1.

The half-bridge configuration of the capacitive transducer 10 is illustrated in FIG. 1. A first capacitor 30 includes electrodes 40 and 44, and a second capacitor 32 includes electrodes 42 and 44. Capacitors 30 and 32 are mounted to a test specimen so that the capacitance of one or both of the capacitors 30, 32 is varied by applied strain, pressure or acceleration. Excitation signals are applied to electrodes 40 and 42, and an output signal is measured on electrode 44, as described hereinafter. The output signal is a measure of the capacitance change, which, in turn, is a function of the applied strain, pressure or acceleration.

The signal conditioner 12 includes a digital waveform generator 60 that generates a waveform which approximates a sine wave. The output of digital waveform generator 60 is coupled through a low-pass filter 62 to form a sine wave. The sine wave is amplified by an amplifier 64. The output of amplifier 64 is coupled to electrode 42 of capacitive transducer 10 and is coupled to the input of a unity gain inverting amplifier 66. The output of inverting amplifier 66 is coupled to electrode 40 of capacitive transducer 10. When the gain of amplifier 66 is exactly unity, sinusoidal excitation signals of equal amplitude and 180 degrees out of phase are applied to electrodes 40 and 42.

Signal electrode 44 is coupled to the input of a preamplifier 70. The output of amplifier 70 is coupled to the input of a synchronous demodulator 72, including a unity gain inverting amplifier 74 and an electronic analog switch 76. The output of preamplifier 70 is coupled to the input of inverting amplifier 74 and to an A-input of analog switch 76. The output of amplifier 74 is coupled to a B-input of analog switch 76. The analog switch 76 includes a control input C, responsive to a binary control signal. In one state of the control signal, an analog input at the A-input is coupled to the output of the analog switch, and in the other state of the control signal, an analog signal at the B-input is coupled to the output. The output of analog switch 76 is coupled through a low-pass filter 80 to the input of an amplifier 82. The output of amplifier 82 is a voltage representative of the strain, pressure or acceleration applied to the capacitive transducer 10.

The digital waveform generator 60 includes a crystal oscillator 102, having an output coupled to the clock input of a shift register 104. The oscillator 102 preferably is frequency-controlled by a 32 kHz crystal 106 of a type used in electronic watches. In a preferred embodiment, the shift register 104 includes eight stages and is implemented in complementary MOS (CMOS) logic circuitry for reasons described hereinafter.

The output of each stage of shift register 104 is coupled through a resistive network to a summing point 108. The first stage output is coupled through a resistor 111 to summing point 108; the second stage is coupled through a resistor 112 to summing point 108; the third stage is coupled through a resistor 113 to summing point 108; the fourth stage is coupled through a resistor 114 to summing point 108; the fifth stage is coupled through a resistor 115 to summing point 108; the sixth stage is coupled through a resistor 116 to summing point 108; the seventh stage is coupled through a resistor 117 to summing point 108; and the eighth stage is coupled through a resistor 118 to summing point 108. The values of resistors 111 to 118 are selected such that an approximately sinusoidal waveform is produced at summing point 108 as shift register 104 is cycled by oscillator 102. The shift register 104 is biased by positive and negative supply voltages of equal value, typically $+5$ V and $-5$ V.

The eight stage output of shift register 104 is coupled through a digital inverter 124 to the data input of shift register 104. The eighth stage output is also coupled through a capacitor 126 to the input of a digital inverter 128. The input of digital inverter 128 is coupled through a resistor 130 to the positive supply voltage $V_{cc}$. The output of inverter 128 is coupled to the reset input of shift register 104. The sixth stage output of shift register 104 is coupled through series connected digital inverters 132 and 134 to the control input of analog switch 76.

In a preferred embodiment, the eight-bit shift register 104 is constructed with two, four-stage, type 4015B shift registers. The inverters 124, 128, 132, and 134 can be standard CMOS inverters, and the analog switch 76 is preferably a type 4053B analog switch. The CMOS circuits can be operated from balanced positive and negative voltage supplies and switch between voltages that are nearly equal to the supply voltages. The preferred values of resistors 111–118 are as follows. Resistors 111, 118=100 kOhms. Resistors 112, 117=37.5 kOhms. Resistors 113, 116=23.7 kOhms. Resistors 114, 115=20 kOhms. The amplifiers 64, 66, 70, 74 and 82 can be type LF353.

The operation of the digital waveform generator 60 can be explained with reference to FIG. 1 and waveform 150 in FIG. 2. Waveform 150 represents the voltage at the summing point 108. Initially, assume that the shift register 104 contains positive outputs in all eight stages. This corresponds to a positive peak 152 of waveform 150, since a positive current is supplied through each of the resistors 111-118 to summing point 108. The positive level at stage eight is inverted by inverter 124, and a negative level is supplied to the input of shiaft * register 104, as indicated by waveform 153. The negative input is shifted through register 104 on succeeding clock pulses and causes the waveform 150 to step in a negative direction. After four clock pulses, the first four stages of register 104 are negative, and the last four stages are positive. At this point, waveform 150 reaches zero. After four more clock pulses, all eight stages are at a negative voltage, and waveform 150 has been stepped to a negative peak 154.

At the negative peak 154, the eighth stage goes negative, and inverter 124 switches a positive voltage to the input of shift register 104. At the same time, the negative going output of the eighth stage is coupled through capacitor 126 to the input of inverter 128, causing a positive pulse to be supplied to the shift register reset line. the positive voltage at the shift register input is shifted through the register on the next eight clock pulses. This causes the waveform 150 to step in a positive direction from negative peak 154 to a positive peak 156. The cycle is then repeated.

The values of the resistors 111–118 determine the magnitude of each step in waveform 150. The values are chosen to approximate the amplitude of a sine wave. For an eight-bit shift register 104, the fundamental frequency of waveform 150 is one-sixteenth of the frequency of oscillator 102. Thus for a 32 kHz oscillator 102, the output waveform 150 is at 2 kHz. It will be understood that a different number of stages can be utilized in the shift register. By using more than eight stages, a sine wave can more closely be approximated.

After passing through low-pass filter 62, the waveform 150 is converted to a sine wave excitation signal. The low-pass filter 62 preferably has a bandwidth of 4 kHz. Waveform 166 in FIG. 2 illustrates the sinusoidal excitation signal applied to electrode 40, and waveform 168 represents the excitation signal applied to electrode 42. The waveforms 166 and 168 are equal in amplitude and are 180° out of phase. Waveforms 166 and 168 are capacitively* coupled from electrodes 40 and 42, respectively, to electrode 44. For the exactly balanced condition where capacitors 30 and 32 are equal, the waveforms 166 and 168 cancel each other and no output signal is provided from electrode 44. For an unbalance of capacitors 30 and 32 in one direction, the signal capacitively coupled from electrode 40 is greater than the signal capacitively coupled from electrode 42. The resulting output on electrode 44 is illustrated as waveform 170 in FIG. 2. For an unbalance in the opposite direction, the output signal, as indicated by waveform 172, is of opposite polarity relative to excitation waveforms 166 and 168.

Figure 2:
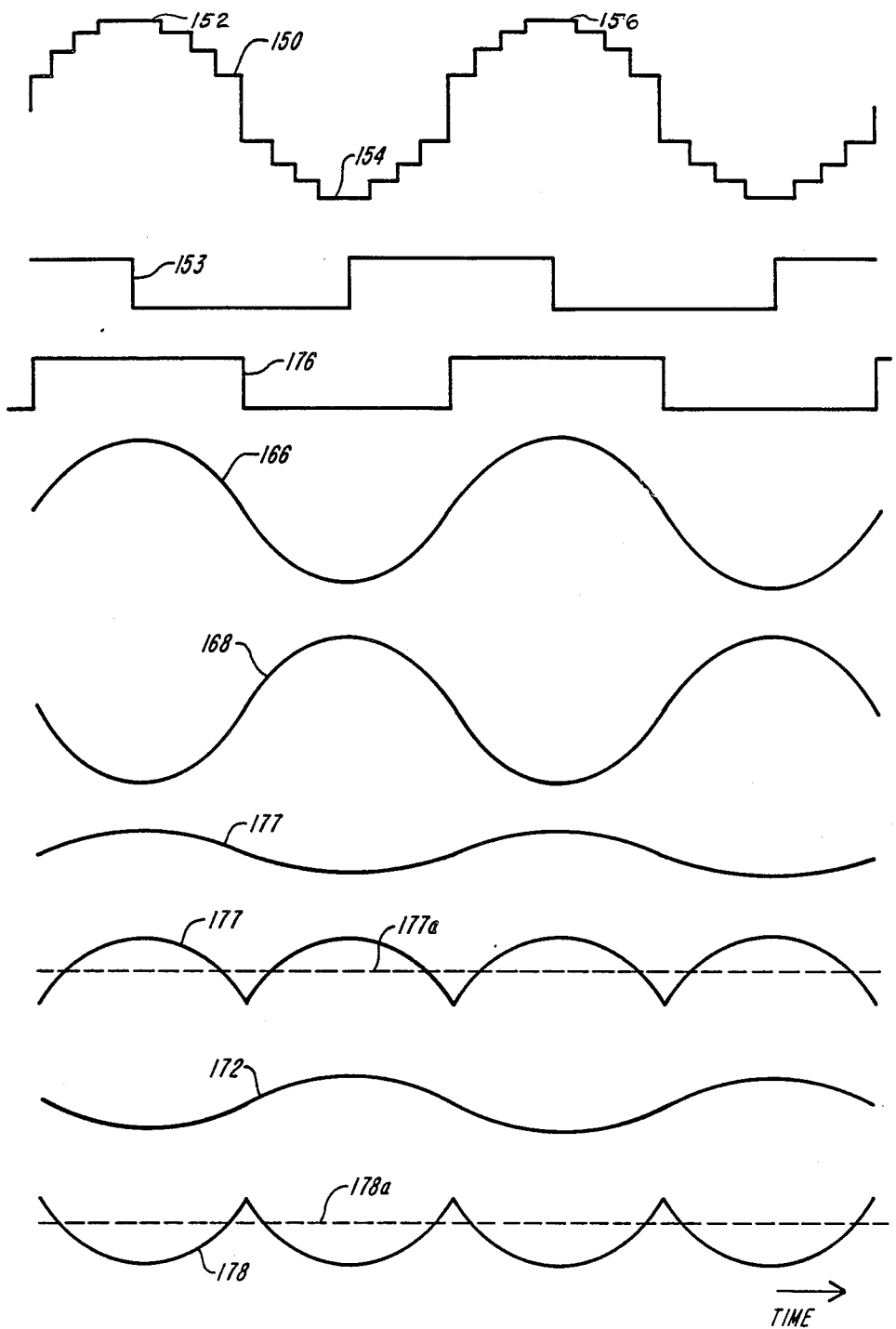
FIG. 2 is a graphic representation of waveforms at different points in the system of FIG. 1.

The output of inverter 134 which controls analog switch 76 is illustrated as waveform 176 in FIG. 2. On every half-cycle of the excitation signal, the analog switch 76 alternates inputs. Thus, on one half-cycle, the analog switch 76 selects the output signal at the A-input, and on the next half-cycle selects the inverted output signal at the B-input. As a result, the output signal from the capacitive strain gage 10 is effectively full-wave rectified. With reference to FIG. 2, waveform 170 is demodulated to provide waveform 177 at the output of analog switch 76. Similarly, waveform 172 is demodulated to provide waveform 178 at the output of analog switch 76. Waveforms 177 and 178 are filtered by low-pass filter 80 to provide average values 177a and 178a, respectively.

With the disclosed demodulator, including analog switch 76 and inverter 74, only output signals that are in phase with the excitation signal or 180° out of phase with the excitation signal will be rectified. Noise and other interference signals are chopped at the demodulator rate, after filtering, do not produce an output. The filter 80 removes the excitation ripple, so that the output signal from amplifier 82 is clean and proportional to the transducer measurement. The lowpass filter preferably has a bandwidth of about 200 Hz for an excitation signal of 2 kHz.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Signal conditioning apparatus for operation of a capacitive transducer, comprising:
   a digital waveform generator for generating a waveform that approximates a sine wave and for generating a binary signal synchronized to said waveform, said waveform having more than two voltage levels;
   filter means responsive to said waveform for providing a first sinusoidal excitation signal;
   inverting means responsive to said first sinusoidal excitation signal for providing a second sinusoidal excitation signal that is 180° out of phase with said first excitation signal;
   means for applying said first and second excitation signals to said transducer so as to produce an output signal from said transducer; and
   demodulating means responsive to said binary signal for synchronously detecting the output signal from said transducer.

2. Signal conditioning apparatus as defined in claim 1 wherein said digital waveform generator includes:
   a clock for generating a clock signal;
   a multiple-stage shift register responsive to said clock signal, each shift register stage having an output;
   a resistor network comprising multiple resistors, each having a first terminal connected to one of the output stages of said shift register and having a second terminal connected to a summing point; and
   means for alternately loading a logic one and a logic zero into said shift register after each half cycle of said waveform, whereby said waveform that approximates a sine wave is produced at said summing point.

3. Signal conditioning apparatus as defined in claim 2 wherein said shift register is biased to produce at each stage binary output levels of equal voltage and opposite polarity.

4. Signal conditioning apparatus as defined in claim 3 wherein said shift register comprises a CMOS shift register.

5. Signal conditioning apparatus as defined in claim 2 wherein said clock comprises a quartz crystal oscillator.

6. Signal conditioning apparatus as defined in claim 3 wherein said demodulating means comprises
   an analog single-pole, double-throw switch including first and second analog inputs and a control input responsive to said binary signal,
   means for applying the output signal of the capacitive transducer to the first analog input of said analog switch, and
   inverting means responsive to the output signal of the capacitive strain gage for providing an inverted output signal to the second analog input of said analog switch.

7. Signal conditioning apparatus as defined in claim 5 wherein said analog switch comprises a CMOS analog switch.

8. A measuring system comprising:
   a differential capacitive transducer including first and second capacitors connected as a capacitive half-bridge, said first and second capacitors having first and second excitation plates and a common output plate;
   a digital waveform generator for generating a waveform that approximates a sine wave and for generating a binary signal synchronized to said waveform, said waveform having more than two voltage levels;
   first filter means responsive to said waveform for providing a first sinusoidal excitation signal coupled to aid first excitation plate;
   inverting means responsive to said first sinusoidal excitation signal for providing a second sinusoidal excitation signal that is 180° out of phase with said first excitation signal and coupled to said second excitation plate;

demodulating means responsive to said binary signal for synchronously detecting a signal on the common output plate of said differential capacitive transducer; and second filter means for removing ana.c. *. component from an output of said demodulating means and providing an output signal.

9. A measuring system as defined in claim 8 wherein said digital waveform generator includes:

a clock for generating a clock signal a multiple-stage shift register responsive to said clock signal, each shift register stage having an output;

a resistor network comprising multiple resistors, each having a first terminal connected to one of the output stages of having a first terminal connected to one of the output stages of said shift register and having a second terminal connected to a summing point; and means for alternately loading a logic one and a logic zero into said shift register after each half cycle of said waveform, whereby said waveform that approximates a sine wave is produced at said summing point.

10. A measuring system as defined in claim 9 wherein said shift register is biased to produce at each stage binary output levels of equal voltage and opposite polarity.

11. A measuring system as defined in claim 10 wherein said shift register comprises a CMOS shift register.

12. A measuring system as defined in claim 9 wherein said clock comprises a quartz crystal oscillator.

13. A measuring system as defined in claim 10 wherein said demodulating means comprises:

an analog single-pole, double-throw switch including first and second analog inputs and a control input responsive to said binary signal, means for applying the output signal of the capacitive transducer to the first analog input of said analog switch, and inverting means responsive to the output signal of the capacitive strain gage for providing an inverted output signal to the second analog input of said analog switch.

14. A measuring system as defined in claim 12 wherein said analog switch comprises a CMOS analog switch.

* * * * *

UNITED STATES PATENT AND TRADEMARK OFFICE
CERTIFICATE OF CORRECTION

PATENT NO.   :   4,896,100

DATED        :   January 23, 1990

INVENTOR(S)  :   Iwar H. Buck

It is certified that error appears in the above-identified patent and that said Letters Patent is hereby corrected as shown below:

>     Column 1, line 4, After the title insert
>     --GOVERNMENT RIGHTS
>        This invention was made with Government support
>     under contract NASI-18411 awarded by NASA.  The
>     Government has certain rights in this invention--.

Signed and Sealed this

Sixteenth Day of June, 1992

Attest:

DOUGLAS B. COMER

Attesting Officer

Acting Commissioner of Patents and Trademarks